Feb. 26, 1963 H. J. FLAIR 3,078,767
HOBBING MACHINE
Filed Aug. 15, 1957 4 Sheets-Sheet 2
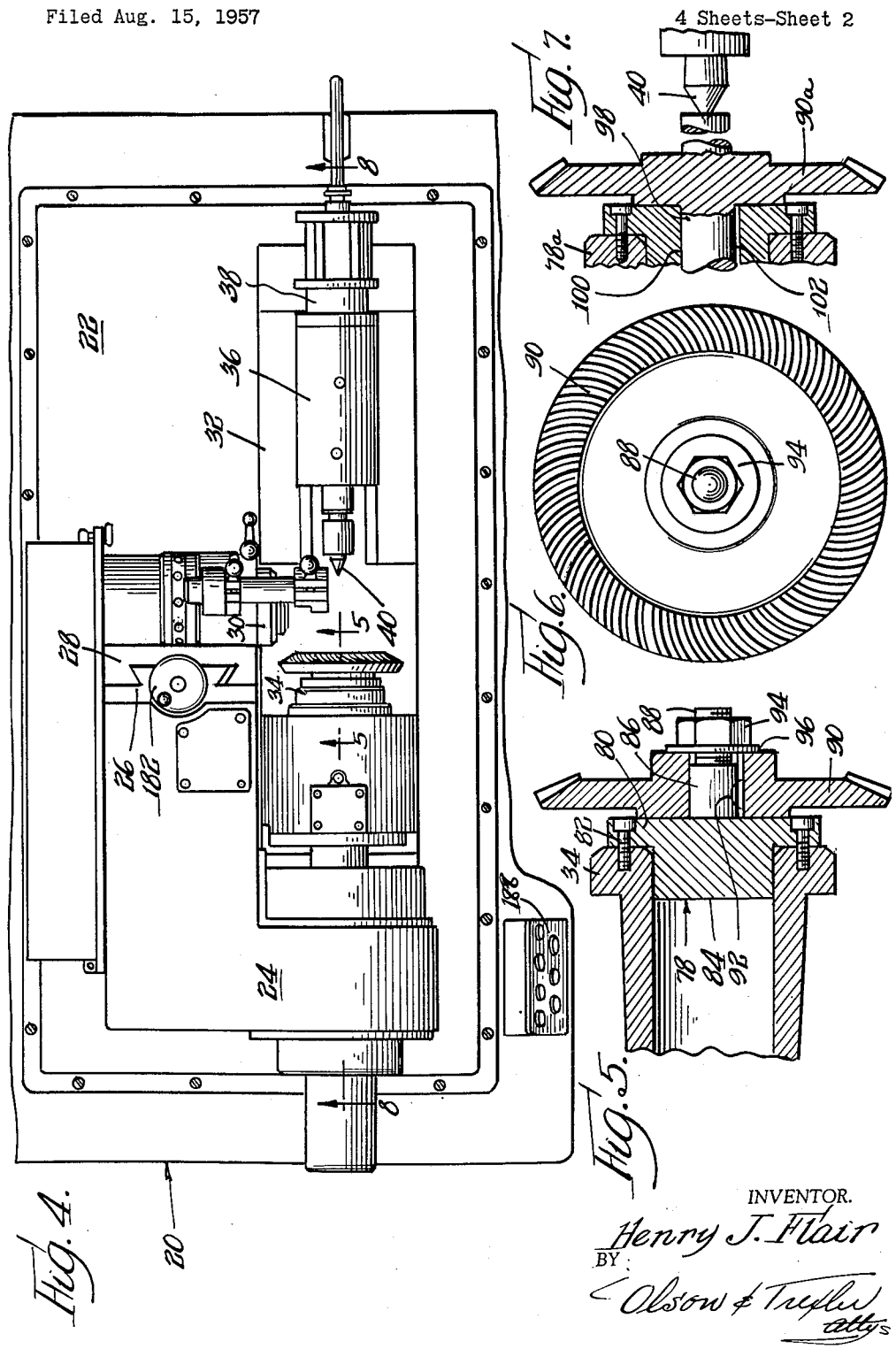
INVENTOR.
Henry J. Flair
BY
Olson & Trexler
attys INVENTOR.
Henry J. Flair
BY:
Olson & Trexler
attys

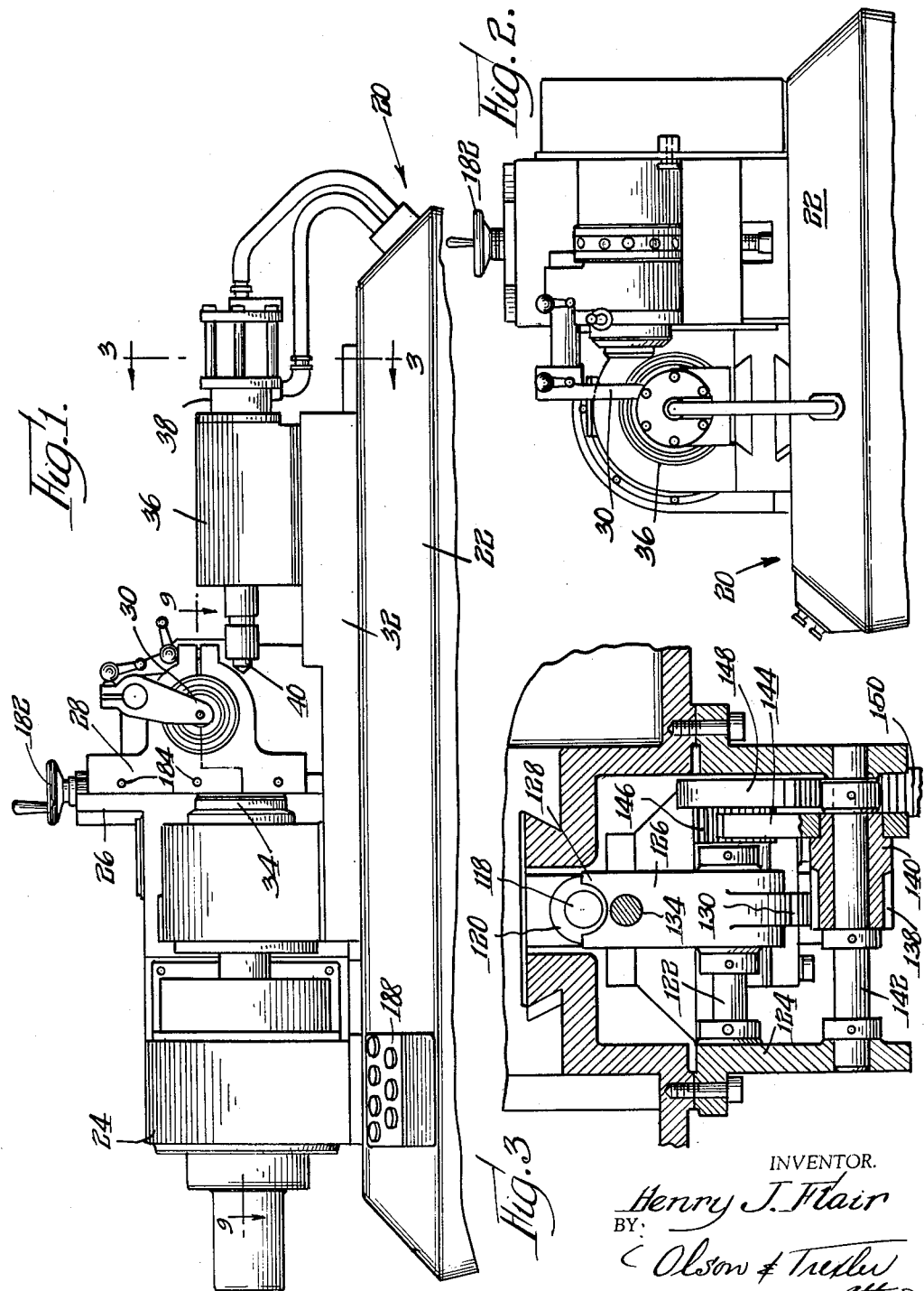

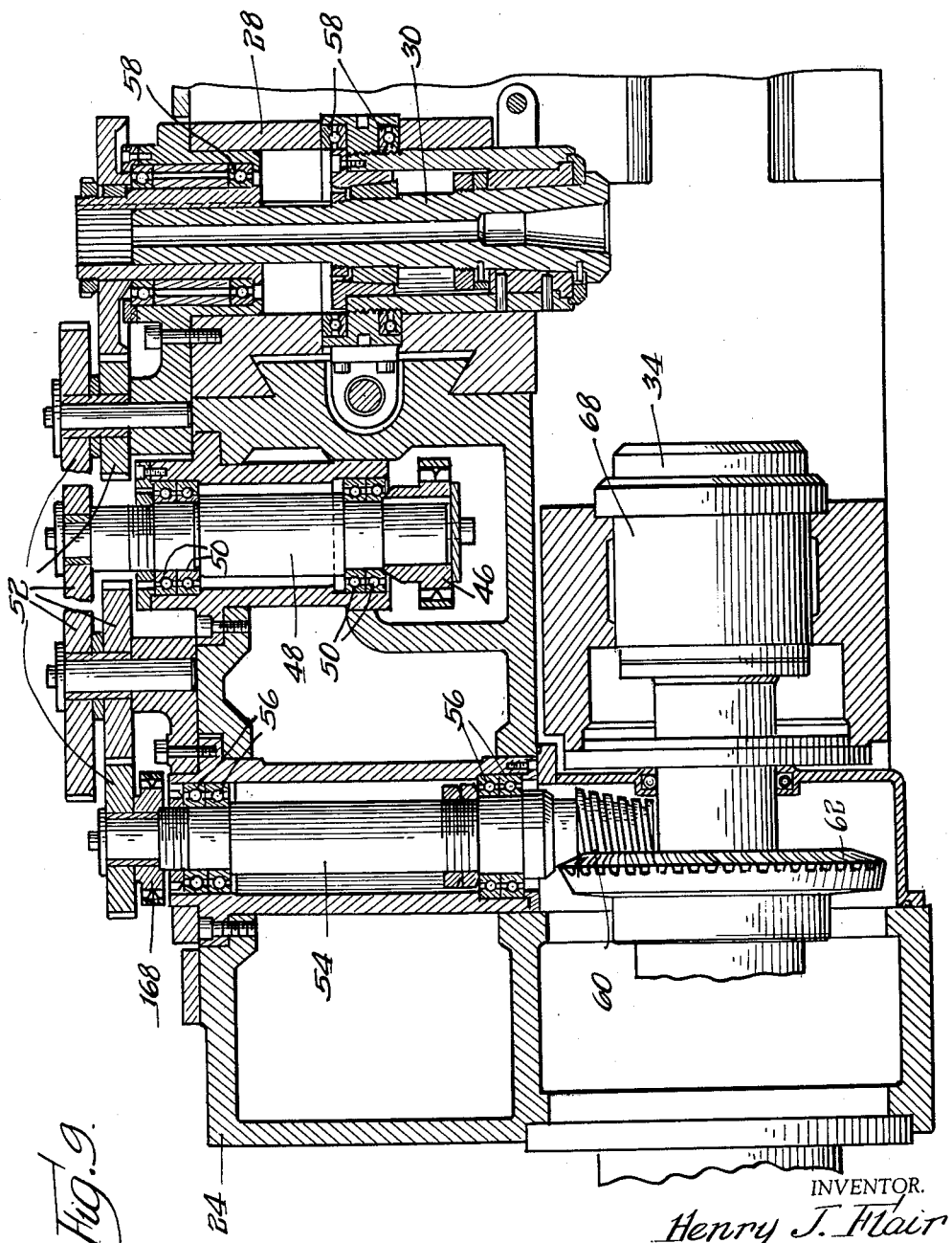

United States Patent Office 3,078,767
Patented Feb. 26, 1963

3,078,767
HOBBING MACHINE
Henry J. Flair, Franklin Park, Ill., assignor to Illinois Tool Works Inc., a corporation of Delaware
Filed Aug. 15, 1957, Ser. No. 678,303
12 Claims. (Cl. 90—4)

This invention relates generally to the art of machine tools, and more particularly to a hobbing machine.

Hobbing machines, in general, are old and well known in the art. In general, hobbing machines include devices for rotating a hob and a workpiece in timed relationship while advancing the work relative to the hob. As a rule, the work is advanced at a rate proportional to the rotation of the hob and of the gear, and this requires a particular drive mechanism. Furthermore, there is usually provided a tilting hob slide to compensate for the angle between the axes of the gear and the workpiece. This results in a rather complicated gearing between the spindles for the hob and the workpiece.

The hobbing machine as disclosed herein finds particular utility in hobbing gears of the type disclosed in Serial U.S. Patent 2,696,125. Such gears are commonly sold under the registered trademark "Spiroid." In a great many practical applications of gears of this type the pinion or worm axis is at right angles to the gear axis, and this machine is admirably adapted to hob gears of this type. Accordingly, it is an object of this invention to provide a hobbing machine having the hob axis and the workspindle axis permanently fixed in a 90° relationship, with resulting simplified interconnecting gearing.

It is another object of this invention to use indexing gearing of the same type of gearing, namely "Spiroid" gearing, as is being hobbed by the machine.

Another object of this invention is to provide a hobbing machine having a rapid approach, a relatively slow feed followed by a dwell, and a rapid retraction.

It is another object of this invention to provide a hobbing machine as set forth in the last preceding object wherein the advance is impositively effected, but positively controlled.

It is further an object of this invention to provide a hobbing machine wherein the feed is independent relative to indexing.

Still another object of this invention is to provide a hobbing machine having a slight lead on the work spindle guide to impart additional rotation thereto, whereby to take advantage of clearance angles of "Spiroid" hobs.

Other and further objects and advantages of the present inventon will be apparent from the following description when taken in connection with the accompanying drawings wherein:

FIG. 1 is a front elevational view of a machine constructed in accordance with the principles of this invention;

FIG. 2 is an end view thereof as taken from the right end of FIG. 1;

FIG. 3 is a cross-sectional view of the hobbing machine as taken along the line 3—3 in FIG. 1;

FIG. 4 is a plan view of the machine;

FIG. 5 is a cross-sectional view through the work holder showing the workpiece in place, as taken substantially along the line 5—5 in FIG. 4;

FIG. 6 is an end of view of the work as taken from the right end of FIG. 5;

FIG. 7 is a view similar to FIG. 5 and showing a modification of the invention;

FIG. 9 is a horizontal longitudinal section through a portion of the machine as taken along the line 9—9 in FIG. 1.

Figure 8:
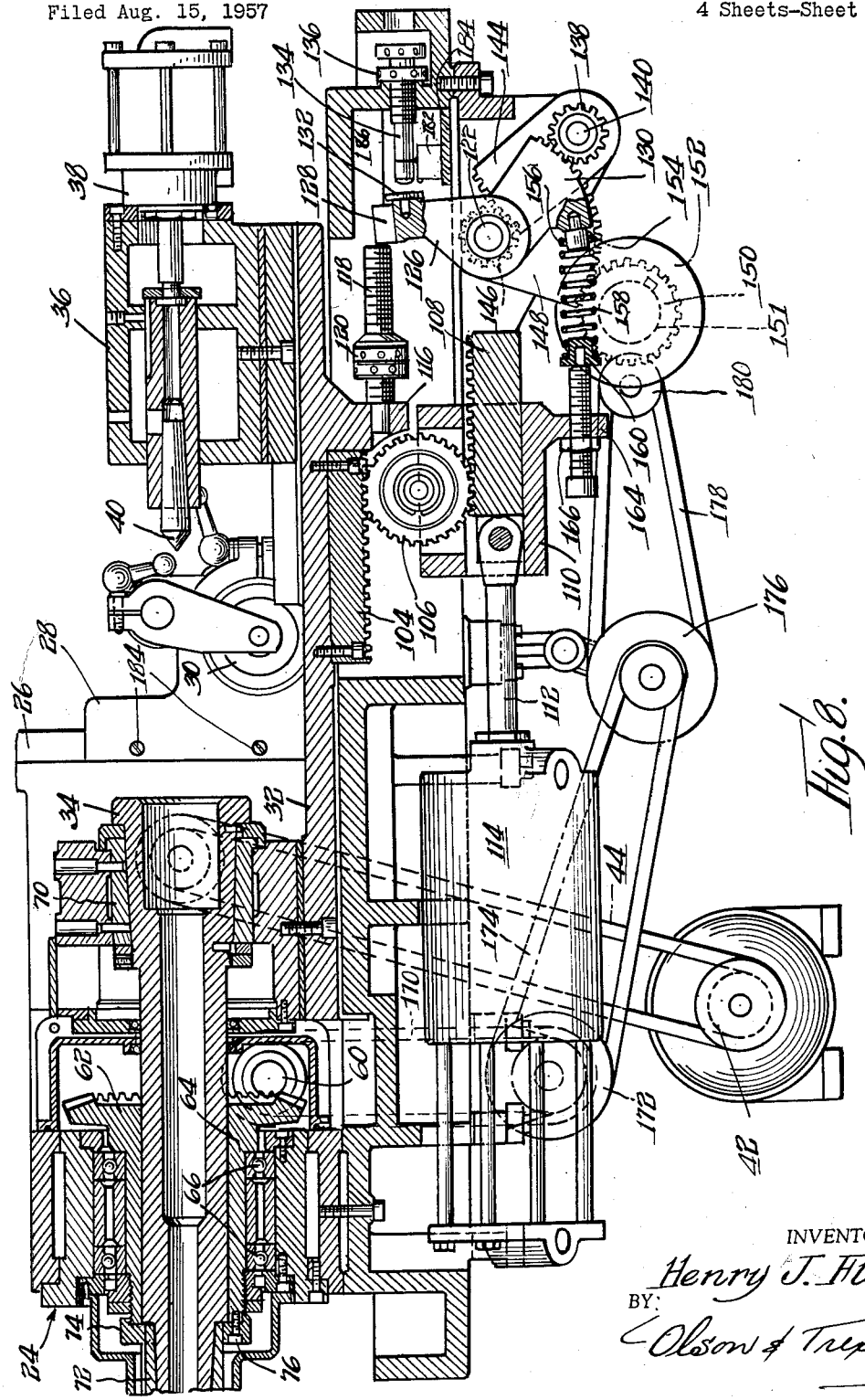
FIG. 8 is a longitudinal section through the machine as taken along the line 8—8 in FIG. 4.

Referring now in greater particularity to the drawings, and first to FIGS. 1–4, there will be seen a hobbing machine constructed in accordance with the principles of this invention, and generally identified by the numeral 20. The machine includes a base or pedestal 22 having a transmission housing 24 thereon. An upstanding slide 26 on the transmission housing mounts a bracket 28 rotatably carrying a hobbing spindle 30.

The pedestal also mounts a longitudinally movable table 32 carrying a mechanism rotatably supporting a work spindle 34, and also carrying a tailstock 36. The tailstock is provided with a hydraulic mechanism 38, of known construction, for rapidly advancing or retracting the tailstock center.

Within the pedestal there is provided a power unit indicated somewhat schematically at 42. This is connected by a Silent chain drive 44 to a sprocket 46 (FIG. 9) fixed on a power input shaft 48 journalled in suitable anti-friction bearings 50 in the transmission housing 24. Power is transmitted from the input shaft 48 through suitable change gears 52 to a "Spiroid" pinion shaft 54 journalled in suitable anti-friction bearings 56 in the transmission housing, and to the hob spindle 30, previously mentioned, and journalled in suitable anti-friction bearings 58 in the bracket 28.

The pinion shaft 54 is provided with "Spiroid" pinion or worm 60 at its forward end, this pinion conveniently being formed integral with the shaft.

With reference to FIG. 8, it will be seen that the work spindle 34 is provided with a "Spiroid" gear 62 meshing with the pinion or worm 60. The gear 62 is provided with a cylindrical sleeve 64 encircling the work spindle, and this sleeve is rotatably journalled in anti-friction bearings 66 carried by the transmission housing 24. The outer or right end of the spindle 34 is rotatably journalled in a sleeve bearing 68 carried by a support 70 fixed to the table 32 for movement therewith.

The left end of the work spindle 34 is provided with a guide or splines 72, and extends through an end guide bushing or nut 74 secured on the gear sleeve 64 by means of bolts 76. The guide bushing 74 has an internal aperture complementary to the guide or splines 72. The guide bushing and spline are provided with a slight lead. Thus, if the work table 32 were moved in the feed direction without any rotation of the pinion 60 and gear 62, the work spindle 34 would rotate slightly. In cutting "Spiroid" gears, this slight lead causes the side of the hob tooth with the greatest clearance to do the majority of the work. Considerably greater hobbing life is thereby attained. However, it is to be understood that the machine would operate if the guide bushing and spline were straight, and would not produce this lead.

Before continuing with the description of the hobbing machine, it is thought desirable to advert to the mounting of the work on the work spindle 34. More particularly as shown in FIGS. 5 and 6, a nut arbor 78 is fixed on the end of the work spindle 34. The work spindle is hollow as will be apparent. The nut arbor 78 includes a circular head 80 through which arcuately spaced bolts 82 extend, the bolts being threaded into the end of the spindle 34. The arbor also is provided with a boss 84 extending into the spindle 34, and with an oppositely extending stud 86 having a reduced threaded end at 88. A "Spiroid" gear blank 90 is received on the stud 86, to which it is keyed as at 92. A nut 94 and washer 96 hold the gear blank 90 on the nut arbor. As will be seen, the gear blank 90 has been worked, as shown in FIGS. 5 and 6, so as to produce a semi-fiinished gear.

In some instances the gear or blank is formed integral with a shaft. An arbor suitable for use with such a workpiece is shown in FIG. 7. Similar parts are identified by the use of similar numerals with the use of the suffix *a*. Thus, the gear blank 90*a* is formed integral with a shaft 98. The arbor or fixture 78*a* is generally similar to the arbor previously described, but is provided with an axial bore 100 receiving the shaft 98. The shaft and arbor are non-rotatably secured together by means such as a key 102. The shaft 98 may extend forwardly of the gear, and in such instances is supported by the tailstock center 40. In many cases it is unnecessary to use the tailstock center.

The table 32, as previously noted, is mounted for reciprocation longitudinally of the machine (left and right as shown in FIGS. 1, 4, 8 and 9). A rack 104 is secured on the underside of the table, and meshes with a pinion 106 rotatably mounted on a shaft carried by a fixed part of the pedestal. A rack 108 is supported in a fixed guide 110 below the pinion, and meshes therewith. This rack is connected by means of a connecting rod 112 to an actuating mechanism 114. This actuating mechanism is of a type sold by the Logansport Machine Company, Incorporated, as "Air-Draulic" cylinders. Such mechanisms are well-known, and combine an air operating circuit with a hydraulic regulation circuit. As is known, it is difficult to control the movement of a piston under air pressure during a feed cycle. Accordingly, in the mechanism 114, an air chamber is provided for advancing a piston, and in opposition thereto is a hydraulic system having metering valves for regulating the speed of axial movement of the air piston.

As will be appreciated, when the rack 108 is shifted to the left (in FIG. 8) the pinion 106 will reverse the motion so that the table is shifted to the right. This causes the work to be fed into the hob. A depending portion 116 of the table 32 mounts a control screw 118 having a positioning nut 120 thereon. A shaft 122 (FIGS. 3 and 8) is carried by a fixed part of the machine as at 124 and has a motion pacing lever 126 provided at its upper end with a yoke 128 through which the screw 118 projects, and against which the nut 120 is adapted to abut. The lever 126 has a sector gear 130 formed integral therewith along the bottom thereof. Thus, the sector gear 130 and the lever 126 pivot in unison about the shaft 122.

The lever 126 is provided with a stop button 132 in substantial alignment with a stop screw 134 threaded through a fixed part of the machine frame or pedestal and having a locking nut 136 thereon.

The sector gear 130 engages the splined end 138 of a member 140 rotatable on a shaft 142 carried by the machine frame. The opposite end of the member 140 has a sector gear 144 keyed thereto so that the sector gear 144 and the splined end or gear portion 138 of the member 140 pivot together about the shaft 142. The sector gear 144 engages a spur gear 146 which rotates about the shaft 122 independently of the lever 126 and sector gear 130. The spur gear 146 is integrally connected to a third sector gear 148 so that both the gears 146 and 148 pivot in unison about the shaft 122. The sector gear 148 meshes with a spur gear 150 fixed on the shaft 151 of an overrunning clutch 152 of the type commonly sold as "Type 1" by the Hilliard Corporation, of Elmira, New York.

As shown in FIGS. 3 and 8, the gear 150 is interconnected with the lever 126 by a gear train which positively transmits rotary motion of the lever 126 to the gear 150. This gear train includes sector gear 130, gear 138, sector gear 144, gear 146, sector gear 148 and gear 150. It will be evident from the construction illustrated that the gear train connecting the lever 126 with the gear 150 has an over-all turns ratio such that the rotary displacement of the gear 150 greatly exceeds that of the lever 126. This stems from the fact that the pitch radius of the driving gear 130 exceeds that of the driven gear 138, the pitch radius of the driving gear 144 exceeds that of the gear 146, and the pitch radius of the gear 148 exceeds that of the gear 150. Because of the geared connection between the lever 126 and the gear 150, neither the lever 126 nor the gear 150 can rotate without the other rotating. Moreover, for any given speed of rotary swinging movement of the lever 126 there must be a corresponding speed of the gear 150 as determined by the gear train connecting these elements.

The sector 130 is provided at the lower left corner thereof, as viewed in FIG. 8, with an abutment 154 having a spring locater button 156 extending therefrom. A helical compression spring 158 encircles the button 156, and the opposite end thereof is seated on a spring abutment 160 at the end of a screw 162 threaded through a depending part 164 of the bracket 110, and adjustably fixed in place by a jam nut 166. As will be appreciated, the spring 158 is compressed as the table 32 is fed forward to cause the workpiece to approach the hob.

A power takeoff sprocket 168 (FIG. 9) is provided on the "Spiroid" spindle 54, and a chain 170 (FIG. 8) is passed over this sprocket and over a multiple sprocket 172. The sprocket 172 drives a chain 174 which acts through a variable speed drive 176 to drive a chain 178. The variable speed drive 176, by way of example, may be the compound variable speed drive sold as Model 6100 by Speed Selector, Inc., of Cleveland, Ohio. The chain 178 drives a sprocket-and-gear unit 180 to control the movement of the driven element of the overrunning clutch 152.

Operation

A hob, preferably a "Spiroid" hob, is placed on the hob spindle 30 in accordance with any known or suitable practice. The hob carrying work slide is adjusted to the proper height by means of the handwheel 182 (FIGS. 1 and 4) and accompanying screw, and is locked in place by tightening of screws 184 along the side of the slide. The workpiece, such as the workpiece 90, is affixed to the work spindle 34, as discussed in connection with FIGS. 5–7 or in accordance with any other suitable practice. If the tailstock center 40 is to be used, it is rapidly advanced into place by means of the hydraulic mechanism 38.

The "Air-Draulic" actuating mechanism 114 is operated, and this mechanism acts through the connecting rod 112, the rack 108, the idler pinion 106, and the rack 104 to advance the table 32 rapidly. The approach of the work to the hob thus is a rapid approach.

Substantially as the work engages the hob, the nut 120 on the screw 118 engages the yoke 128 of the lever 126. The lever 126 accordingly is pivoted and the pinion gears and sectors drive the driving element of the overrunning clutch 152. The driving element is positively limited in speed by engagement with the driven element which is positively controlled by the chains and the variable speed drive 176 as effected by the power takeoff from the "Spiroid" shaft 54. As will be appreciated, this limits the speed of advance of the table 32 and a slow feed is effected.

Having reference to FIG. 8, the force of the actuator 114 serves to move the table 32 to the right, to overcome the force of the spring 158, and to urge the lever 126 in a clockwise direction about the shaft 122. Movement of the lever 126 in the clockwise direction operates through the coacting gearing to turn the sector gear 144 counterclockwise, to turn the gear 148 clockwise and to turn the gear 150 counterclockwise, all with reference to FIG. 8. As recited, the gear 150 is the driving element of the over-running clutch 152.

The action of the actuator 114 in advancing the table 32 to the right with reference to FIG. 8 turns the gear 150 counterclockwise, as recited. This counterclockwise driving movement of the gear 150 operates through the over-running clutch 152 to drive the sprocket and gear unit 180 connected to the driven side of the clutch 152, i.e., the side of the clutch 152 opposite from the driving gear 150.

However, the unit 180 is connected, as previously decribed, to the driving transmission for the work spindle 34 and hob spindle 30 in a manner such that the speed of the unit 180 is positively synchronized with the speed of the hob and work spindles.

The actuator 114 operates through the over-running clutch 152 and the unit 180 to provide a secondary drive which tends to turn the hob spindle 30 and work spindle 34. However, the resistance to turning of the spindles 30 and 34 during the hobbing operation is such that the strength of the table sliding actuator 114 is insufficient to turn the spindles independently of the much more powerful motor or power unit 42 provided for turning the spindles 30, 34. Hence, the operating speed of the spindles 30 and 34, and the operating speed of the unit 180 are determined essentially by the motor or power unit 42.

Consequently, the gear unit 180 becomes in effect a rotary abutment against which the gear 150 acts through the clutch 152. The maximum speed of the gear 150 in a driving direction, counterclockwise with reference to FIG. 8, is determined by the speed of the unit 180, which is positively synchronized with the spindles 30, 34. Hence, the speed of the gear 150 under the force of the actuator 114 becomes the speed at which the unit 180 recedes rotatably with respect to the clutch 152. This maximum speed of the gear 150 as it is positively synchronized with the spindles 30, 34, determines the maximum rotary speed at which the lever 126 can swing, since the lever 126 has a predetermined speed ratio in relation to the gear 150, as described. The actuator 114 does have strength sufficient to move the lever 126 at the maximum speed permitted by the rotatably receding gear unit 180. This maximum permitted speed of the lever 126 determines the speed of the yoke 128, and hence determines the speed of the abutment 120 engaging the yoke 128, to determine the speed of translation of the table 32 and work spindle 34 under the yieldable force applied by the fluid actuator 114.

When advancement of the table 32 is stopped by engagement of the stop button 132 with the stop screw 134, the gear 150 connected with the stop lever 126 also stops. However, the gear unit 180 connected with the "driven" end of the clutch 152 keeps right on turning in synchronism with the spindles 30 and 34. Continued rotation of the unit 180 in the same direction after the driving gear 150 stops is permitted by the inherent "over-running" character of the clutch 152.

A switch 182 (FIG. 8) is adjustably mounted, as on a slide 184 adjacent the stop screw 134 and is coupled thereto as at 186. Upon engagement of the stop button 132 with the stop screw 134 and with the switch 182, a timing device (which may be in the control panel 188, FIGS. 1 and 4) for the dwell period is actuated. At the end of the timed dwell period, power is cut off and, through suitable valving, the "Air-Draulic" actuating mechanism 114 returns to its initial position. The table, and hence the work carrying spindle return to initial position for unloading of the hobbed workpiece and reloading. The spring 158 returns the lever 126 and the various sectors and pinions to initial position.

As previously alluded to, the guide 74 and splines 72 effect a slight lead of the work spindle 34 during advance thereof, whereby to take advantage of the clearance angles of the "Spiroid" hobs.

As will be apparent from the foregoing description, the feed of the table and workpiece is independent of the indexing of the workpiece.

The specific example of the invention as herein shown and described is set forth for illustrative purposes only. Various changes in structure will no doubt occur to those skilled in the art and are to be understood as forming a part of this invention insofar as they fall within the spirit and scope of the appended claims.

The invention is claimed as follows:

1. In a hobbing machine, the combination of a rotary hob spindle, first transmission means connected to rotate said hob spindle, a work spindle, second transmission means connected to rotate said work spindle, movable support means supporting one of said spindles for translation relative to the other spindle, yieldable force applying means connected to said support means to apply a yieldable translating force thereto, third transmission means synchronized with one of said first and second transmission means and including an output element operated in synchronization with said one transmission means, and a follow-up element connected for movement by said movable support means and coacting with said output element to limit translation of said support means in accordance with the instantaneous position of said output element.

2. In a hobbing machine, the combination of a hob spindle, a work spindle, power transmission means coacting with said spindles to rotate the latter in synchronization with each other, a movable support supporting one of said spindles for feeding movement relative to the other spindle, a fluid actuator connected with said support to yieldably urge the latter in the direction of feeding movement thereof, a feed synchronizing transmission interconnected with said power transmission means to operate in synchronized timed relation to the latter and including a first limit stop element movable in synchronization with said power transmission means at a rate corresponding to a predetermined feeding rate of said movable support relative to the rotary speed of said spindles, and a second limit stop element mounted for movement by said movable support in a path disposed in interfering relation to said first limit stop element to effect upon mutual engagement of said first and second stop elements a forced restriction of the feeding speed of said movable support to said predetermined feeding rate.

3. In a hobbing machine, the combination of a hob spindle, a work spindle, movable means coacting with one of said spindles for feeding the one spindle relative to the other spindle, a transmission coacting with said spindles to drive the latter in synchronized relation to each other, an overrunning clutch having a driven element thereof interconnected with said transmission to have a rotary speed which is positively limited by said transmission to a speed corresponding with a predetermined rate of feeding of said one spindle relative to the rotary speed of said spindles, a first movable limit stop connected to the driving element of said overrunning clutch to effect a driving of the clutch upon movement of the limit stop in one direction along a predetermined path, yieldable means coacting with said movable limit stop to urge the latter in a direction opposite to said one direction to a normal starting position on said path, a controllable fluid motor connected with said movable means to yieldably urge the latter in a spindle feeding direction thereof, and a second limit stop interconnected with said movable means for movement by the latter along said predetermined path in said one direction in interfering relation with said first limit stop to engage the latter upon feeding movement of said movable means to limit the rate of feeding movement of said movable means to said predetermined rate relative to the rotary speed of said spindles.

4. In a hobbing machine, the combination of a hob spindle, a work spindle, transmission means coacting with said spindles to rotate the latter in synchronization with each other, movable means coacting with one of said spindles for feeding the one spindle relative to the other spindle, a speed limiting element coacting with said transmission means for movement at a speed positively limited by the transmission means to a speed corresponding to a predetermined rate of feeding movement of said one spindle relative to the rotary speed of said spindles, a yieldable actuator connected with said movable means for urging the latter to advance in a direction for feeding said one spindle relative to said other spindle, and means forming an effective lost motion transmission coacting with said movable means and said speed limiting element to become effective after a predetermined advancement of the movable means to limit the rate of advancement of the movable means to a feeding speed determined by the rate of progressive movement of said speed limiting element.

5. In a machine tool, the combination of a support mounted for movement along a predetermined path, yieldable actuating means interconnected with said support for applying to the latter a limited force tending to move the support along said path, a movable retreating element, mechanical transmission means coacting with said retreating element to limit movement of the latter to a speed corresponding to a predetermined rate of motion of said support, and a motion restraining element mounted and interconnected with said support for movement by the latter in following relation to said retreating element to effect upon engagement of said restraining element with said retreating element a positive restriction of the speed of said support to said predetermined rate of motion.

6. In a machine tool, the combination of a rotary spindle, a movable support mounted for translation along a predetermined path, yieldable actuating means interconnected with said support for applying to the latter a limited force tending to translate the support along said path, a first limit stop element for the support interconnected with the support for movement in synchronization therewith, a second limit stop element movably disposed in interfering relation to movement of said first limit stop element by said movable support, and mechanical drive means positively interconnected with said second stop element to limit movement of the latter by said first stop element to a speed corresponding to a predetermined rate of translation of said movable support.

7. In a machine tool, the combination of a rotary spindle, a translatable support, yieldable fluid actuating means coacting with said support to translate the latter, a transmission connected to rotate said spindle, an over-running clutch having a driven member interconnected with said transmission for rotation at a speed limited by the transmission to a speed corresponding to a predetermined rate of translation of said support relative to the rotary speed of said spindle, and means forming a lost motion connection between said movable support and the driving element of said clutch to effect driving of said clutch driving element against said clutch driven element by translation of said movable support.

8. In a machine tool, the combination of a rotary spindle, feeding means, means supporting said feeding means for movement, yieldable actuating means coacting with said feeding means to apply a yieldable actuating force thereto, a transmission connected to rotate said spindle, an overrunning clutch having a driven member interconnected with said transmission for rotation at a speed limited by the transmission to a speed corresponding to a predetermined rate of movement of said feeding means relative to the rotary speed of said spindle, said clutch including a driving member, and means forming a lost motion drive between said feeding means and said clutch driving member to effect driving of said clutch driving member against the restraint of said clutch driven member upon movement of said feeding means by said actuating means to limit the feeding speed of said feeding means to said predetermined rate of movement.

9. In a hobbing machine, the combination of a rotary hob spindle, first transmission means connected to said hob spindle to rotate the latter, a rotary work spindle, movable support means supporting said work spindle for movement in a direction generally parallel to the axis of the work spindle, second transmission means synchronized with said first transmission means and having a rotary output end synchronized with said hob spindle, coupling means connecting said output end of said second transmission means to said work spindle to rotate the latter, a speed limiting element coacting with said second transmission means for movement at a speed positively limited by said second transmission means to a speed corresponding to a predetermined rate of feeding movement of said work spindle relative to the rotary speed of said output end of said second transmission means, a yieldable actuator coacting with said movable support means for urging the latter in said direction to advance said work spindle in relation to said hob spindle; means forming an effective lost motion drive between said movable means and said speed limiting element which allows said movable means to advance to a predetermined position, unrestrained by said speed limiting element, and serves upon advancement of said movable means to said predetermined position to limit the rate of continued advancement of the movable means to a feeding speed determined by the rate of progressive movement of said speed limiting element, and said coupling means coacting with said movable means and including means responsive to progressive displacement of said movable means for progressively rotating said work spindle relative to said output end of said second transmission means to produce a progressive rotary displacement of the work spindle which is superimposed on the rotary movement of the work spindle by said second transmission means.

10. In a machine tool, the combination of a rotary spindle, feeding means supported for translation, yieldable actuating means coacting with said feeding means to apply a yieldable actuating force thereto to effect translatory advancement thereof, a transmission connected to rotate said spindle, an over-running clutch having a driven member interconnected with said transmission for rotation at a speed limited by the transmission to a speed corresponding to a predetermined rate of movement of said feeding means relative to the rotary speed of said spindle, said clutch including a driving member, a rotatable pacing element for said feeding means, a gear train connecting said pacing element to said driving member of said clutch to transmit rotary motion of said pacing element to said driving member, and means forming between said feeding means and said pacing element a lost motion connection which provides a range of free motion of said feeding means in relation to said pacing element and which serves upon advancement of said feeding means beyond said range of motion to positively constrain said feeding means to motion which is synchronized to movement of said pacing means that is determined by the operating speed of said driven member of said clutch.

11. In a machine tool, the combination of a rotary spindle, feeding means supported for translation, yieldable actuating means coacting with said feeding means to apply a yieldable actuating force thereto to effect translation thereof, a transmission connected to rotate said spindle, an over-running clutch having a driven member interconnected with said transmission for rotation at a speed limited by the transmission to a speed corresponding to a predetermined rate of movement of said feeding means relative to the rotary speed of said spindle, said clutch including a driving member, an abutment coacting with said feeding means for movement along a predetermined path by said feeding means, abutment engaging means, a swingable lever supporting said abutment engaging means in said path of said abutment to be engaged by the latter upon advancement of said feeding means by said yieldable actuating means, a gear train connecting said swingable lever to said driving member of said clutch to transmit rotary motion of said lever to said driving member, means urging said lever to a normal position thereof, said abutment being separable from said abutment engaging means whereby said abutment and said abutment engaging means form between said feeding means and said lever a lost motion drive which permits advancement of said feeding means by said actuating means without restraint by said lever until said abutment engages said abutment engaging means and which serves subsequent to engagement of said abutment with said abutment engaging means to effect driving of said clutch driving member against the restraint of said driven member of said clutch to limit the feeding speed of said feeding means to said predetermined rate of movement, and positive stop means coacting with said feeding means to positively terminate advancing movement of the latter in a predetermined position of the feeding means after said abutment has effected a predetermined swinging movement of said lever away from the normal position of the latter.

12. In a hobbing machine, the combination of a rotary hob spindle, a rotary work spindle, power driving means interconnected with said spindles for rotating the latter in synchronized relation to each other, movable support means supporting one of said spindles for translation relative to the other spindle, yieldable force applying means connected to said support means to apply a yieldable translating force thereto for advancing said one spindle relative to the other spindle, transmission means synchronized with said power driving means and including an output element operated in positive synchronization with said power driving means, a motion pacing element positioned for movement by said movable support means and coacting with said output element to limit translation of said support means by said yieldable force applying means to conform the position of said support means to the instantaneous position of said output element; and said power driving means including means coacting with said movable support means and interconnected with said work spindle to respond to progressive advancement of said one spindle relative to said other spindle to produce a progressive rotary displacement of the work spindle, as an incident to progressive advancement of said one spindle, which is superimposed on the rotary displacement of said work spindle by said power means.

References Cited in the file of this patent

UNITED STATES PATENTS

| | | |
|---|---|---|
| 1,014,706 | Houghton | Jan. 16, 1912 |
| 2,246,671 | Fischer | June 24, 1941 |
| 2,484,856 | Purvin | Oct. 18, 1949 |
| 2,528,242 | Praeg | Oct. 31, 1950 |
| 2,563,918 | Casella et al. | Aug. 14, 1951 |
| 2,684,016 | Staples | July 20, 1954 |
| 2,847,910 | Staples et al. | Aug. 19, 1958 |